No. 629,024. Patented July 18, 1899.
D. C. BARNARD.
WASHING MACHINE.
(Application filed Nov. 24, 1897.)
(No Model.)
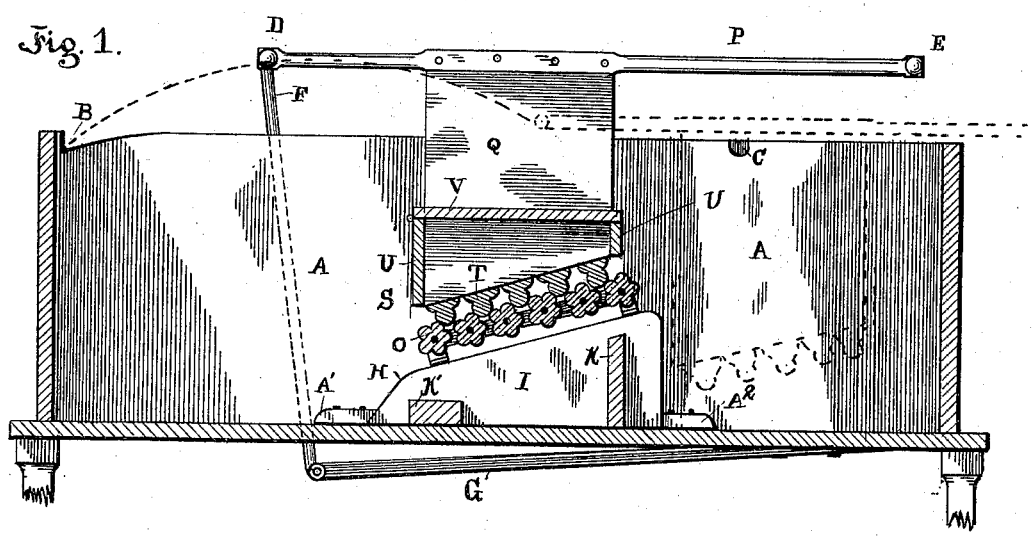
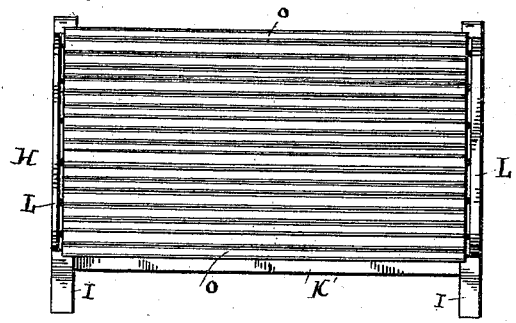
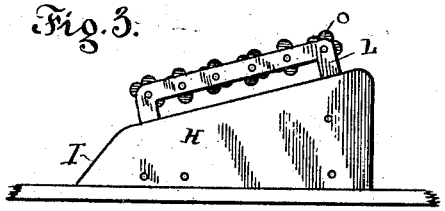
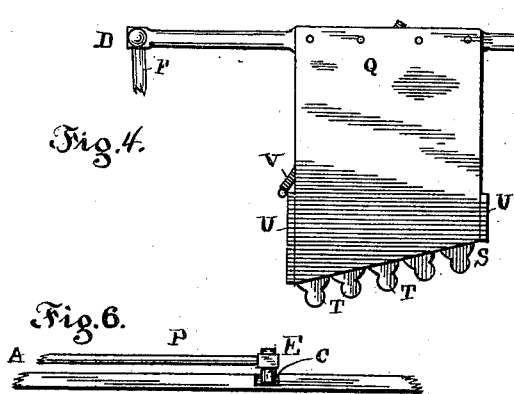
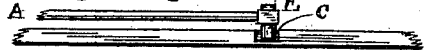
WITNESSES
Chas. K. Davies.
J. Bartlett.
INVENTOR
D. C. Barnard
By W. H. Bartlett
Attorney

UNITED STATES PATENT OFFICE.

DAVID C. BARNARD, OF BINGHAMTON, NEW YORK.

WASHING-MACHINE.

SPECIFICATION forming part of Letters Patent No. 629,024, dated July 18, 1899.

Application filed November 24, 1897. Serial No. 659,658. (No model.)

*To all whom it may concern:*

Be it known that I, DAVID C. BARNARD, residing at Binghamton, in the county of Broome and State of New York, have invented certain new and useful Improvements in Washing-Machines, of which the following is a specification, reference being had therein to the accompanying drawings.

This invention relates to washing-machines.

The object of the invention is to produce a compact and simple washing-machine of the class known as "reciprocating-rubber" washing-machines; and the invention consists in certain constructions of parts and combinations of elements, substantially as hereinafter described, and particularly pointed out in the claims.

Figure 1 is a longitudinal central section of the machine, the legs being broken away. Fig. 2 is a top plan view of the roller-bed. Fig. 3 is a side elevation thereof. Fig. 4 is a side elevation of the rubber and soaper with handles attached. Fig. 5 is a bottom plan of the rubber and soaper. Fig. 6 is a broken detail of the box and handle.

The box A, preferably of wood, is a rectangular box, in general like that shown in Patent No. 371,730, granted October 18, 1887, to myself and another, to which patent reference is made and on which this invention is an improvement.

The notch B in box A affords a resting-place for the bar D when the machine is folded and cover applied. The notch C, however, does not go through the side of the box, but is simply a recess therein, and the end of handle E extends into this notch or recess when the machine is stowed for transportation or for the application of the cover.

The roller-bed H has two wooden side pieces I I in form of wedges or inclined planes. These side pieces are connected by wooden cross-bars K K', thus forming a trough or bottomless box for a dirt-receptacle between the side pieces and cross-bars of the wooden roller-bed. The roller-bed is of such width as to neatly fit the box and is held against endwise movement by stops A' A² at the bottom of the box and at the corners of the roller-bed when in working position, as shown in Fig. 1. The roller-bed when in this position is preferably about midwise of the box and rests on the bottom thereof, so that the dirt-receptacle between the sides and cross-bars has its bottom formed by the bottom of box A. The roller-bed may be removed from the position shown in Fig. 1 for transportation or stowage by simply lifting out the stops and moving to either end of box A.

On top of the side bars I of the roller-bed I arrange metallic brackets L L, which brackets have short legs secured to the side pieces I, and the body of these brackets extends parallel with the top of the side pieces. These metallic brackets are thin, and the rollers O, journaled in said brackets, may extend almost to the side of box A, the ends of the rollers being above the bars I I.

O O indicate fluted rolls, preferably of wood and having metallic axes or journals extending into holes in the brackets L. These rollers thus form a bed, the rolls of the bed being out of contact with each other and free to turn and the top of the bed being inclined, as shown. This roller-bed forms the surface on which the clothes are washed; but as the rolls rotate freely there is little rubbing of the clothes in the sense ordinarily known as "rubbing."

The rubber S has its rubbing-surface composed of fluted bars T T, extending transversely of the machine. The rubber S is supported on bars P P, which extend lengthwise of the machine, the width of the rubber and bars being such as to permit the inclosure within the box save where the cross-bar D, connected to bars P, projects at the side of the box, and is connected by the usual pitmen F to the usual springs G, which springs are arranged below the box A. The rubber S is suspended from bars P P by rigid side pieces Q, which side pieces are about as wide as the rubber, the bars T T being rigidly attached to the lower ends of these pieces Q. The bars T are fluted or corrugated lengthwise, as shown, and their outer surfaces thus very nearly correspond with the spaces between the upper surfaces of the rolls in the roller-bed. Thus, as shown in Fig. 1, one of the fluted bars of the rubber may enter or project between two of the fluted rolls of the roller-bed, and one of the fluted rolls of the roller-bed may enter or project between two of the fluted bars of the rubber when the rubber is brought into closest relation with the roller-bed. When the rubber, with clothing thereunder, is reciprocated, the clothing bearing lightly on the rollers of the roller-bed will cause them to rotate, thus causing a light beating action on the clothing.

The bars T are far enough apart to leave passages between them. The sides of the side pieces Q are connected by strips U U, which, with the fluted bars and side pieces Q, form a box with a slotted bottom. To this box a hinged cover V is applied, which cover may be held open or closed by suitable fastenings. This box thus forms a receptacle for soap, and the soap may pass through the slits in its bottom directly to the clothes. The soap-box will generally be above the level of the water in the wash-box. When a dirty place is seen in the clothes, the rubber and soap-box may be quickly moved to one end of the wash-box and dipped into the water. The covered soap-box will receive some water, or the cover may be left loose, so that the soap-box will fill with water. Then when the rubber is carried back over the roller-bed the water in the soap-box will flow down through the slots between the bars and will carry some of the soap with it, and if the cover of the soap-box fits pretty closely this escape of the water will be quite gradual; but the soap-box is not left all the time in the water, as in some other machines, as in such case the soap would much sooner dissolve.

The capacity for dipping the soap-box into the water and carrying it back on top of the clothing on the rub-board enables me to apply both soap and water where the same may be most needed, and I do not depend, as in most other machines of this character, on a water-supply entirely from below the clothing.

The roller-bed and rub-board should be less than one-third the length of the box and may be much less than that. The box in washing should be filled with water about up to the lower roller of the roller-bed. The clothing to be washed may be placed in either end of the machine, and by entering an end or corner of a piece or pieces between the roller-bed and rubber and moving the rubber lightly back and forth the garment or cloth will be soused in the water and the dirt loosened. By slightly raising the handle the rubber can be moved over so as to bear on a new portion of the clothing, and the garment may be fed back and forth across the rub-board and rubbed along the surface thereof until the dirt is entirely removed, a little experience enabling the operator to move the pieces and to do the most rubbing on dirty spots without touching the clothes with the hands.

When it is desirable to apply more soap to the garments or to apply it to a particular part, the rubber is swung away from the roller-bed, (toward the right in Fig. 1,) and by lowering the handle the soap-box is dipped in the water at the end of the roller-bed. (See dotted lines, Fig. 1.) The rubber takes up water through its slotted bottom, and this water takes with it a quantity of soap down onto the clothing, when the rubber is restored to working position on the roller-bed.

The fluted roller and bars together give a better hold on the clothing than either plain rolls or bars, and as the pressure of the bars and rolls is thus exerted in longitudinal lines at short distances from each other the device is very effective for the removal of dirt from soiled clothing.

The facility for applying soap without touching the soap by hand by dipping the rubber and soaper into the water at the end of the roller-bed adds greatly to the capacity and convenience of the machine.

What I claim is—

1. The washing-machine having a roller-bed, a reciprocating rubber provided with a slotted bottom and a soap-box above said bottom, and a handle connection by which the rubber and soap-box may be lowered into the water at the end of the roller-bed, the wash-box extending beyond the end of the roller-bed sufficiently to permit the immersion of the soap-box in the water at the end of the roller-bed, substantially as described.

2. In a washing-machine, the combination of the roller-bed arranged on an incline and having fluted rolls, and the rubber having fluted bars arranged at the same distance apart as the rolls of the bed, so that a bar of the rubber may partially enter between two bed-rolls, and a roll of the bed partially enter between two bars of the rubber, all combined substantially as described.

3. In a washing-machine, the combination of the fluted roller-bed, the fluted rubber with slots between the bars, and the covered soap-box above said fluted rubber, means provided for immersing the soap-box in the water at the end of the roller-bed, substantially as described.

4. The roller-bed composed of wedge-shaped wooden side pieces, the metallic brackets above said side pieces, and the fluted rollers having their journals in said brackets and their ends above the said pieces, combined with the box and rubber.

5. The box having side notches B and side recesses C, combined with the rubber, the bars P supporting said rubber, and the cross-bar D of a length to extend through notches B, and the cross-bar E of a length to lie in recesses C for storage, and below the top level of the box, substantially as described.

In testimony whereof I affix my signature in presence of two witnesses.

DAVID C. BARNARD.

Witnesses:
W. A. BARTLETT,
THOMAS J. STALEY.